United States Patent
Yasuda

(10) Patent No.: US 11,842,119 B2
(45) Date of Patent: Dec. 12, 2023

(54) DISPLAY SYSTEM THAT DISPLAYS VIRTUAL OBJECT, DISPLAY DEVICE AND METHOD OF CONTROLLING SAME, AND STORAGE MEDIUM

(71) Applicant: CANON KABUSHIKI KAISHA, Tokyo (JP)

(72) Inventor: Takayuki Yasuda, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 50 days.

(21) Appl. No.: 17/575,752

(22) Filed: Jan. 14, 2022

(65) Prior Publication Data

US 2022/0244899 A1 Aug. 4, 2022

(30) Foreign Application Priority Data

Feb. 2, 2021 (JP) .................... 2021-015070

(51) Int. Cl.
*G06F 3/14* (2006.01)
*G06T 7/50* (2017.01)
*G06F 3/01* (2006.01)
*G06F 3/04817* (2022.01)
*G06T 7/70* (2017.01)
*G06T 19/00* (2011.01)

(52) U.S. Cl.
CPC ............ *G06F 3/1423* (2013.01); *G06F 3/017* (2013.01); *G06F 3/04817* (2013.01); *G06T 7/50* (2017.01); *G06T 7/70* (2017.01); *G06T 19/006* (2013.01)

(58) Field of Classification Search
CPC .... G06F 3/1423; G06F 3/017; G06F 3/04817; G06T 7/50; G06T 7/70; G06T 19/006

USPC .......................... 345/418, 633, 156; 715/825
See application file for complete search history.

(56) References Cited

U.S. PATENT DOCUMENTS

| | | | |
|---|---|---|---|
| 9,886,796 B2 | 2/2018 | Kobayashi | |
| 10,334,076 B2 | 6/2019 | McKenzie et al. | |
| 2013/0031511 A1* | 1/2013 | Adachi | G06F 3/0481 |
| | | | 715/825 |
| 2015/0022444 A1* | 1/2015 | Ooi | G06V 20/20 |
| | | | 345/156 |
| 2015/0062164 A1* | 3/2015 | Kobayashi | G06T 11/60 |
| | | | 345/633 |
| 2016/0163109 A1 | 6/2016 | Kobayashi | |
| 2018/0164404 A1* | 6/2018 | Koga | G01S 19/42 |

(Continued)

FOREIGN PATENT DOCUMENTS

| | | |
|---|---|---|
| JP | 2015-032131 A | 2/2015 |
| JP | 2017-146651 A | 8/2017 |

*Primary Examiner* — Prabodh M Dharia
(74) *Attorney, Agent, or Firm* — Venable LLP

(57) ABSTRACT

A display system that makes it possible to obtain high operability while maintaining visibility when a virtual object is displayed. The display system includes a smartphone as an information processing apparatus and smart glasses as a head mounted display that is capable of communicating with the smartphone and has an image capturing section. Information on the smartphone is detected from an image captured by the image capturing section. The smart glasses include a display section that is capable of displaying a virtual object, and a virtual object is displayed on the display section in a position adjacent to the smartphone or in a manner partially superimposing the virtual object on the smartphone, based on the detected information.

16 Claims, 13 Drawing Sheets

(56) References Cited

U.S. PATENT DOCUMENTS

2018/0321798 A1* 11/2018 Kawamura ........... G06F 3/0481
2022/0327646 A1* 10/2022 Suzuki ................. A63F 13/213

* cited by examiner

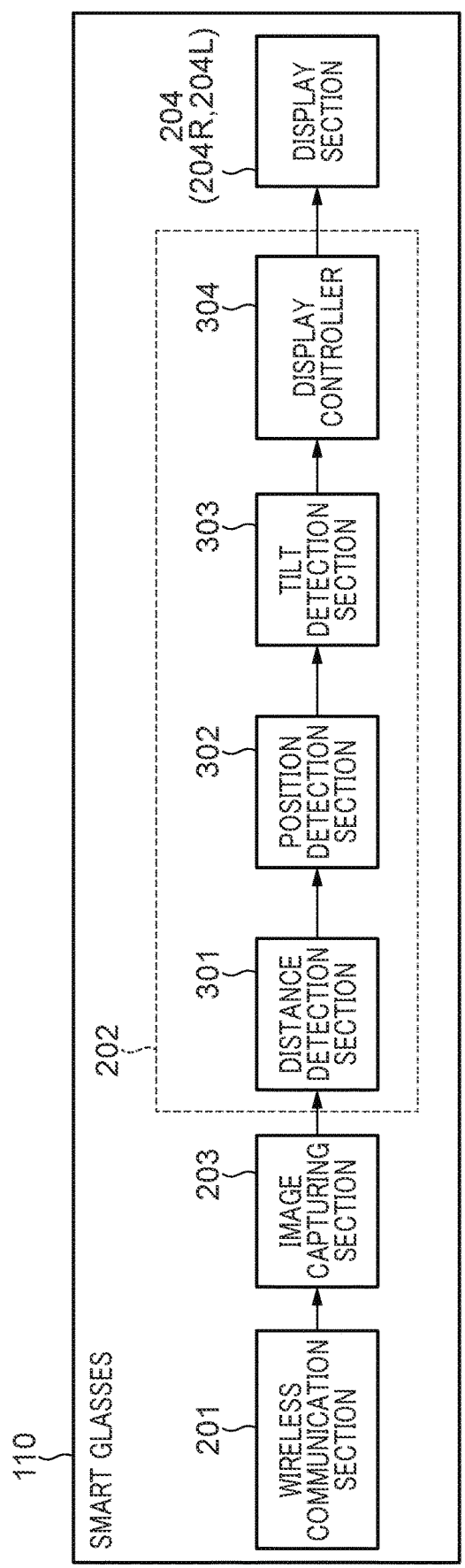
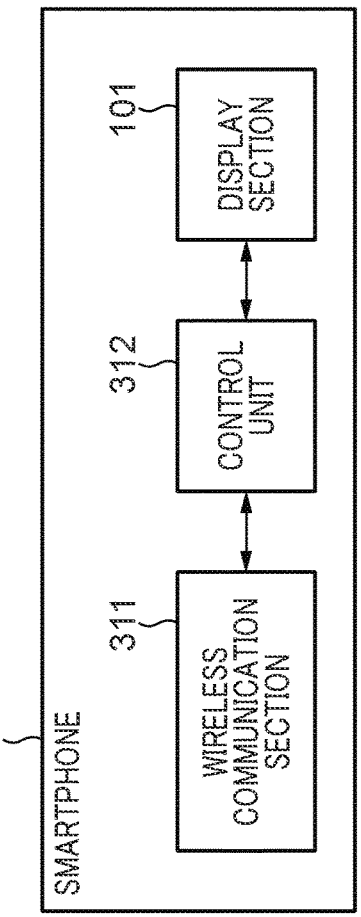

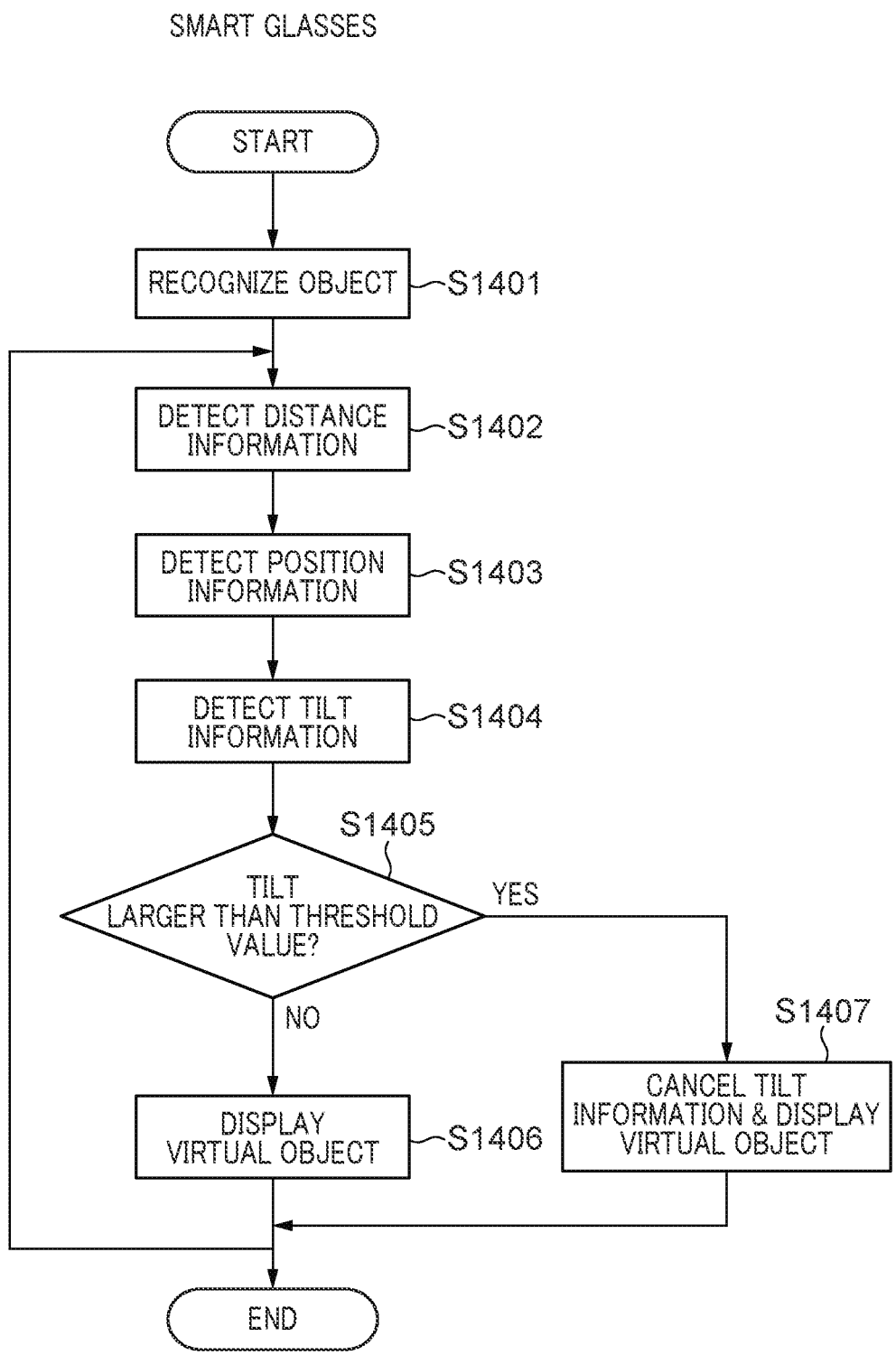

DISPLAY SYSTEM THAT DISPLAYS VIRTUAL OBJECT, DISPLAY DEVICE AND METHOD OF CONTROLLING SAME, AND STORAGE MEDIUM

BACKGROUND OF THE INVENTION

Field of the Invention

The present invention relates to a display system that displays a virtual object, a display device and a method of controlling the same, and a storage medium.

Description of the Related Art

There is known a technique for effectively displaying an augmented reality image on a display section of a head mounted display. For example, Japanese Laid-Open Patent Publication (Kokai) No. 2015-32131 describes a technique for displaying an augmented reality image on a display section of a head mounted display, in a state added to a real object, to thereby make it possible to obtain high realistic feeling.

However, although the technique described in Japanese Laid-Open Patent Publication (Kokai) No. 2015-32131 makes it possible to display a virtual object in a state added to a real object, the technique suffers from a problem that the visibility is lowered and a problem that the operability of the virtual object is lowered due to the lowering of the visibility.

SUMMARY OF THE INVENTION

The present invention provides a display system that makes it possible to obtain high operability while maintaining visibility when a virtual object is displayed.

In a first aspect of the present invention, there is provided a display system including an information processing apparatus, and a head mounted display that is capable of communicating with the information processing apparatus and has an image capturing unit, the display system including a detection unit configured to detect information on the information processing apparatus from an image captured by the image capturing unit, wherein the display device includes a display section that is capable of displaying a virtual object, and a display control unit configured to display the virtual object on the display section in a position adjacent to the information processing apparatus or in a manner partially superimposing the virtual object on the information processing apparatus, based on the information.

In a second aspect of the present invention, there is provided a head mounted display that is capable of communicating with an information processing apparatus by wireless communication, including an image capturing unit, a display section that is capable of displaying a virtual object, and a display control unit configured to display the virtual object on the display section in a position adjacent to the information processing apparatus or in a manner partially superimposing the virtual object on the information processing apparatus, based on information on the information processing apparatus, which is detected from an image captured by the image capturing unit.

In a third aspect of the present invention, there is provided a method of controlling a display system including an information processing apparatus, and a head mounted display that is capable of communicating with the information processing apparatus and has an image capturing unit, including detecting information on the information processing apparatus from an image captured by the image capturing unit, and displaying a virtual object on a display section of the display device in a position adjacent to the information processing apparatus or in a manner partially superimposing the virtual object on the information processing apparatus, based on the information.

In a fourth aspect of the present invention, there is provided a method of controlling a head mounted display including an image capturing unit, including establishing communication with an information processing apparatus, and displaying a virtual object in a position adjacent to the information processing apparatus or in a manner partially superimposing the virtual object on the information processing apparatus, based on information on the information processing apparatus, which is detected from an image captured by the image capturing unit.

According to the present invention, it is possible to realize a display system that makes it possible to obtain high operability while maintaining visibility when a virtual object is displayed.

Further features of the present invention will become apparent from the following description of exemplary embodiments (with reference to the attached drawings).

BRIEF DESCRIPTION OF THE DRAWINGS

FIG. 3A is a schematic block diagram of the smart glasses as a component of the display system according to a first embodiment.

FIG. 3B is a schematic block diagram of a smartphone as a component of the display system.

FIG. 14 is a flowchart of a control process of the smart glasses in the third embodiment.

DESCRIPTION OF THE EMBODIMENTS

The present invention will now be described in detail below with reference to the accompanying drawings showing embodiments thereof.

Figure 1:
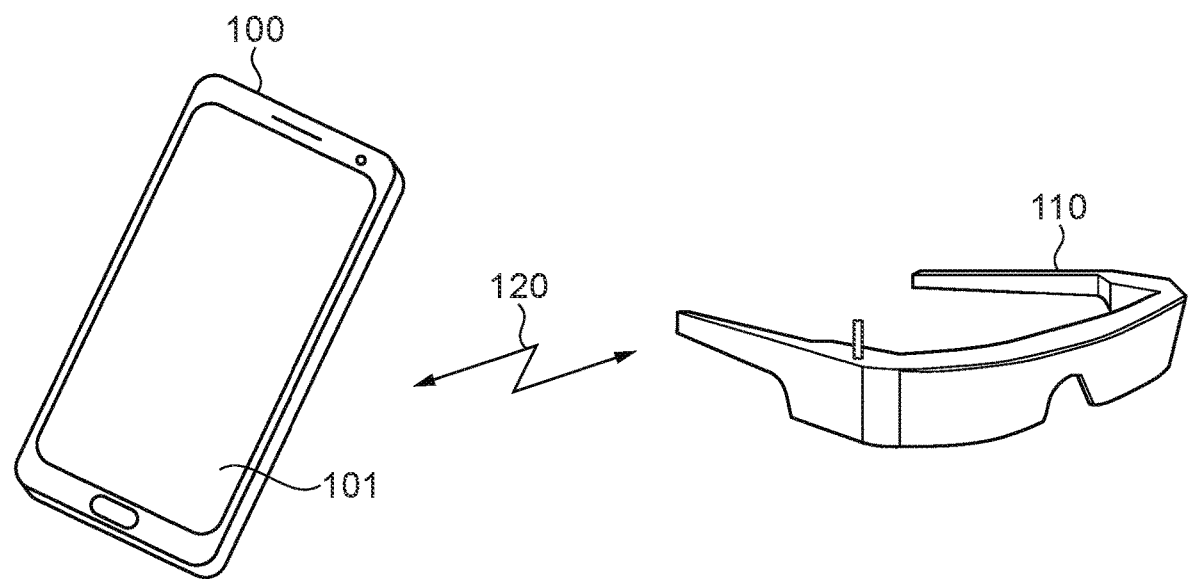
FIG. 1 is a schematic view of a display system according to embodiments of the present invention.

FIG. 1 is a schematic view of a display system according to embodiments of the present invention. The display system shown in FIG. 1 is formed by communicably connecting a smartphone 100 as an example of an information processing apparatus and smart glasses 110 as an example of a head mounted display via a wireless communication path 120.

The smartphone 100 is capable of displaying a variety of icons, photograph information, and so forth, and further, has a display section 101 on which a touch panel is disposed in a state superposed thereon such that a touch operation can be performed. The smartphone 100 will be described hereinafter in more detail.

Note that there is no problem of using a well-known smartphone as the smartphone 100, and hence detailed description thereof is omitted. Further, the information processing apparatus as a component of the display system according to the present invention is not limited to the smartphone 100, and may be another electronic device, such as a tablet PC or a portable game machine. In the present embodiment, the information processing apparatus is assumed to be of a portable type which is held and operated by a user's hand.

The wireless communication path 120 communicably connects between the smartphone 100 and the smart glasses 110. As the wireless communication path 120, there may be mentioned direct communication using Bluetooth (registered trademark) or Wi-Fi, wireless LAN communication using an access point, not shown, and so forth, but the communication method is not particularly limited. Communication performed between the smartphone 100 and the smart glasses 110 includes a pairing request sent from the smart glasses 110 to the smartphone 100 and a pairing permission response sent from the smartphone 100 to the smart glasses 110 in response to this pairing request.

Figure 2:
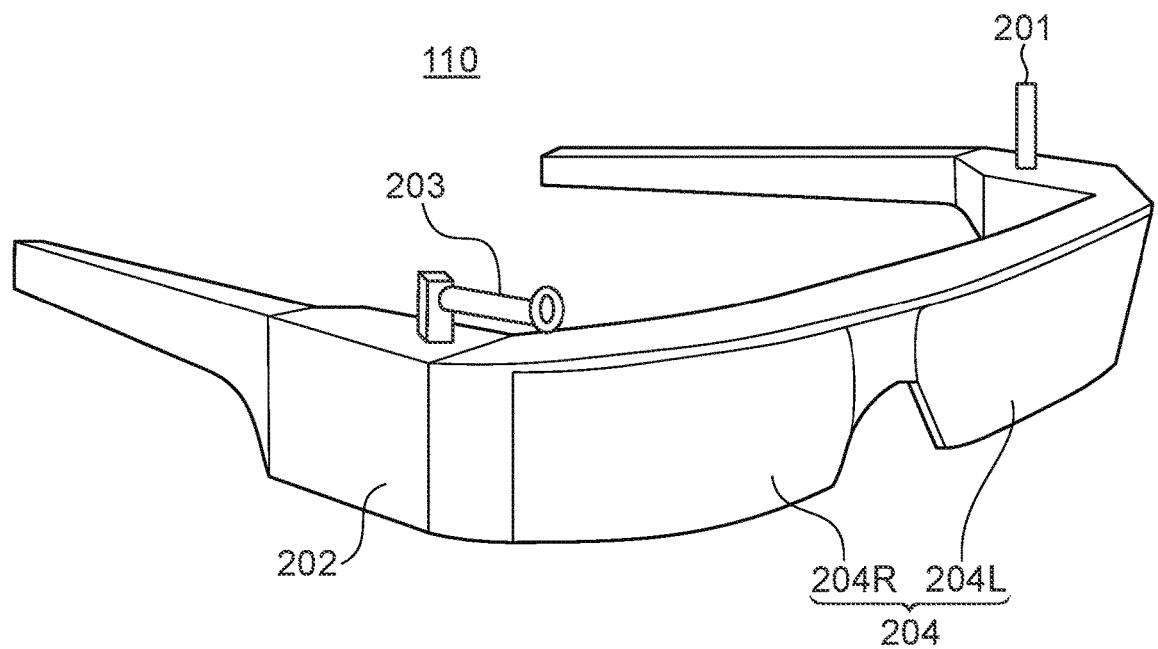
FIG. 2 is a perspective view of the appearance of smart glasses.

Next, the smart glasses 110 will be described with reference to FIG. 2. FIG. 2 is a perspective view of the appearance of the smart glasses 110. Note that in FIG. 1, the smart glasses 110 are illustrated by omitting details thereof. The smart glasses 110 include wireless communication section 201, a control unit 202, an image capturing section 203, and a display section 204. Further, the smart glasses 110 include an operation section, not shown, including a power switch, and so forth.

The smart glasses 110 are configured as a glasses-type head mounted display (HIVID). The smart glasses 110 are also configured as an optical transmission type HMD on which a user can visually recognize an image (display image) displayed on the display section 204 and directly view an outside scenery at the same time. Note that the head mounted display as a component of the display system according to the present embodiment is not limited to the glasses type, but may be of any other type, such as a goggles type which encloses an area surrounding the eyes or a helmet type which covers the entire head.

The wireless communication section 201 bidirectionally communicates with the smartphone 100 via the wireless communication path 120. Note that in FIG. 2, the wireless communication section 201 is illustrated as an antenna for symbolizing the same but may be incorporated within a frame of the smart glasses 110. The image capturing section 203 is a camera having a lens and an image sensor, but is not limited to this. For example, the image capturing section may be implemented by a LIDAR (Laser Imaging Detection and Ranging) device. That is, the image capturing section may employ any type, insofar as it can acquire a captured image (distance image) of an object. The control unit 202 controls the overall operation of the smart glasses 110 and will be described hereinafter in detail with reference to FIG. 3.

The smart glasses 110 are configured as the optical transmission type HMD as mentioned above. That is, the display section 204 corresponding to lenses of general glasses is formed of a material which is high in translucency (high in transmittance) and forms a transmission type display that does not block a visual field of a user when the display section 204 is in a state not displaying an image. Further, the smart glasses 110 are configured such that the smart glasses 110 display a virtual object 600 (see e.g. FIGS. 6A, 6B, and 7) on the display section 204 which is the transmission type display and also enable a user to visually recognize a real object through the display section 204. The display section 204 is comprised of a right display section 204R disposed in front of a user's right eye and a left display section 204L disposed in front of a user's left eye.

FIG. 3A is a schematic block diagram of the smart glasses 110 according to a first embodiment. The smart glasses 110 include the wireless communication section 201, the control unit 202, the image capturing section 203, and the display section 204. The wireless communication section 201, image capturing section 203, and the display section 204 have been described with reference to FIG. 2, and hence description thereof is omitted here.

The control unit 202 is implemented by a so-called microcomputer comprised of a CPU, a ROM, a RAM, and a flash memory. The CPU loads predetermined programs stored in the ROM into the RAM and executes the loaded programs, whereby the control unit 202 functions as a detection section and a display controller 304. The detection section includes a distance detection section 301, a position detection section 302, and a tilt detection section 303, and detects information on the smartphone 100 from an image captured by the image capturing section 203. Note that the CPU controls a variety of operations which can be executed by the smart glasses 110 by loading an OS program stored in the ROM into the RAM.

The distance detection section 301 detects information on a distance from the smart glasses 110 (display section 204) to the smartphone 100 from an image captured by the image capturing section 203, as an item of information on the smartphone 100. Here, in the description of the first embodiment, it is assumed that wireless connection for executing wireless communication via the wireless communication path 120 has been established between a wireless communication section 311 (see FIG. 3B) of the smartphone 100 and the wireless communication section 201 of the smart glasses 110 (the smartphone 100 and the smart glasses 110 have been subjected to pairing). As the distance information, the distance detection section 301 detects a distance L between the smart glasses 110 (display section 204) and the smartphone 100, as distance information of e.g. "L=50 cm", from an image of the smartphone 100 captured by the image capturing section 203 by calculation (image processing).

The position detection section 302 detects position information of the smartphone 100 from an image of the smartphone 100 captured by the image capturing section 203 by calculation (image processing), as an item of information on the smartphone 100. The position information of the smartphone 100 refers to information indicating in which position (which direction) the smartphone 100 exists within the captured image with respect to the display section 204. Note that the method of detecting the position information will be described hereinafter with reference to FIG. 4.

The tilt detection section 303 detects tilts of the smartphone 100 of which an image is captured, from the image of the smartphone 100 captured by the image capturing section 203 by calculation (image processing) as an item of information on the smartphone 100. More specifically, the tilt detection section 303 detects a tilt in a vertical rotational direction, a tilt in a horizontal rotational direction, and a tilt in a rotational axis direction. Note that the method of detecting the tilt information of the smartphone 100 will be described hereinafter with reference to FIG. 5.

The display controller 304 performs control for displaying a virtual object on the display section 204 based on the information on a distance, a position, and tilts detected by the distance detection section 301, the position detection section 302, and the tilt detection section 303, respectively.

FIG. 3B is a block diagram of the smartphone 100. The smartphone 100 includes the wireless communication section 311, a control unit 312, and the display section 101. The wireless communication section 311 provides, for example, permission in response to a communication establishment request, such as a pairing request, sent from the smart glasses 110 via the wireless communication path 120. Further, the control unit 312 is comprised of a CPU, a ROM, a RAM, and an EEPROM, and controls the overall operation of the smartphone 100 by executing predetermined programs stored in the ROM or the EEPROM. The display section 101 is formed by superposing a touch panel as operating means on a liquid crystal display or an organic EL display that displays a variety of information.

Next, the method of detecting the smartphone 100 by the smart glasses 110 will be described. First, the method of detecting a position of the smartphone 100 by the position detection section 302 of the smart glasses 110 will be described.

Figure 4:
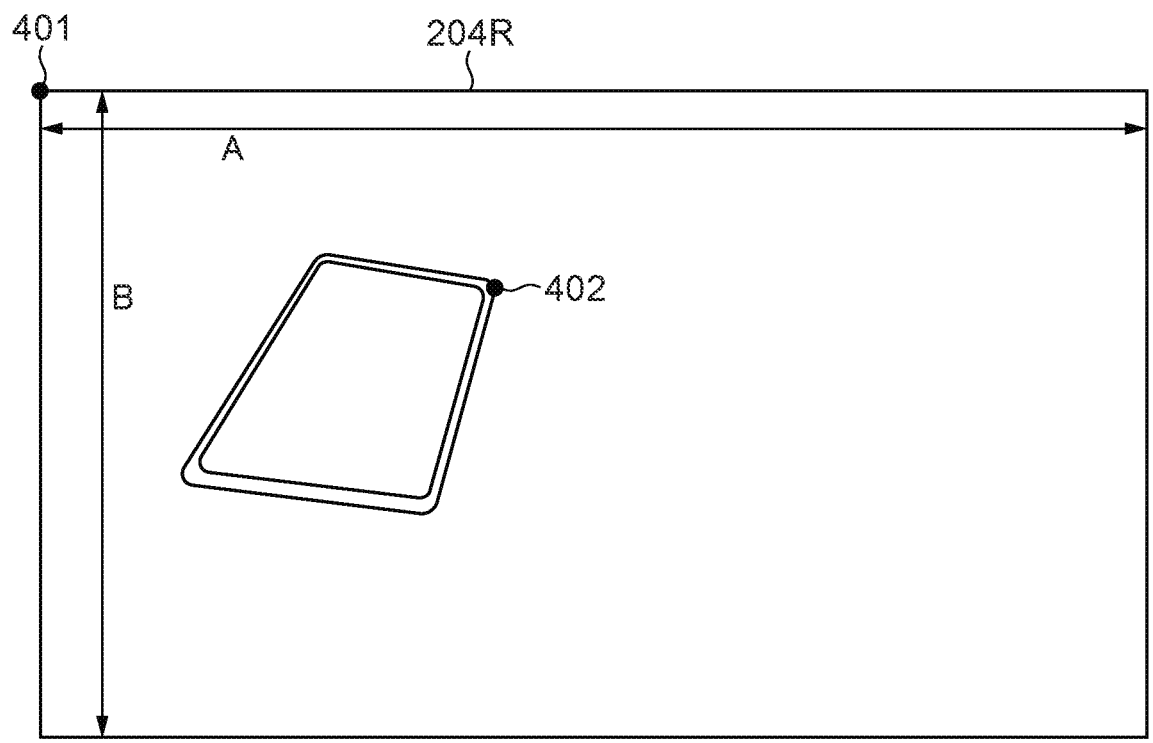
FIG. 4 is a view showing an example of a state of the smartphone in the first embodiment in a position visible through a right display section.

FIG. 4 is a view showing an example of a state of the smartphone 100 in the first embodiment in a position visible through the right display section 204R. As described above, the position information of the smartphone 100 is obtained by using an image captured by the image capturing section 203 when the smartphone 100 is in a position within a photographing field angle of the image capturing section 203. Coordinates 402 of the smartphone 100 are defined by a position of an upper right corner of the smartphone 100 with respect to an origin 401 of the right display section 204R. The right display section 204R has a lateral length represented by "A" and a vertical length represented by "B". For example, in a case where the right display section 204R has a lateral length of A=3 cm and a vertical length of B=2 cm, the position detection section 302 detects the coordinates 402 of the smartphone 100 as [vertical position, lateral position]=[1.5 cm, 0.5 cm].

Next, the method of detecting tilts of the smartphone 100 by the tilt detection section 303 will be described. The tilt detection section 303 detects a tilt in the vertical rotational direction, a tilt in the horizontal rotational direction, and a tilt in the rotational axis direction.

Figure 5A:
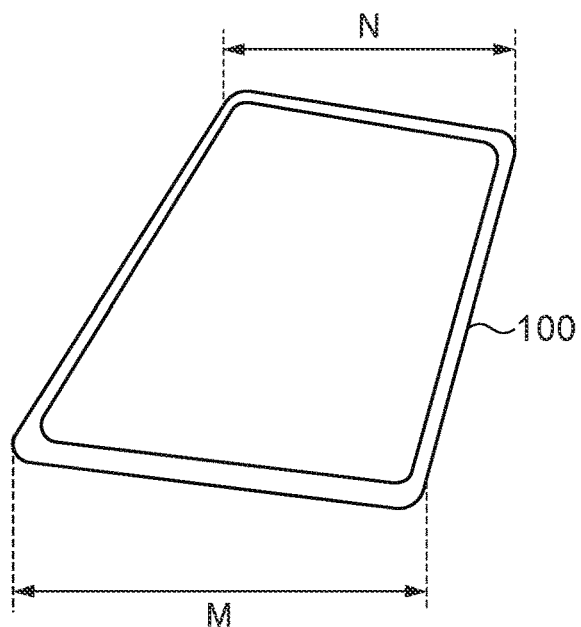
FIGS. 5A to 5C are schematic views showing a method of detecting tilts of the smartphone in the first embodiment.

FIG. 5A is a schematic view showing a method of detecting a tilt of the smartphone 100 in the vertical rotational direction. Note that FIG. 5A, and FIGS. 5B and 5C, described hereinafter, show the smartphone 100 in a simplified manner. The vertical rotational direction of the smartphone 100 refers to a direction of rotation about an axis orthogonal to the vertical direction. The tilt of the smartphone 100 in the vertical rotational direction is obtained by a ratio between a length "M" of a lower side and a length "N" of an upper side of an image of the smartphone 100 captured by the image capturing section 203. For example, in a case where M=5 and N=4 are detected, the tilt in the vertical rotational direction is determined as M:N=5:4. Note that the smartphone 100 is assumed to have a substantially rectangular shape, as viewed from a direction orthogonal to the display section 101.

Figure 5B:
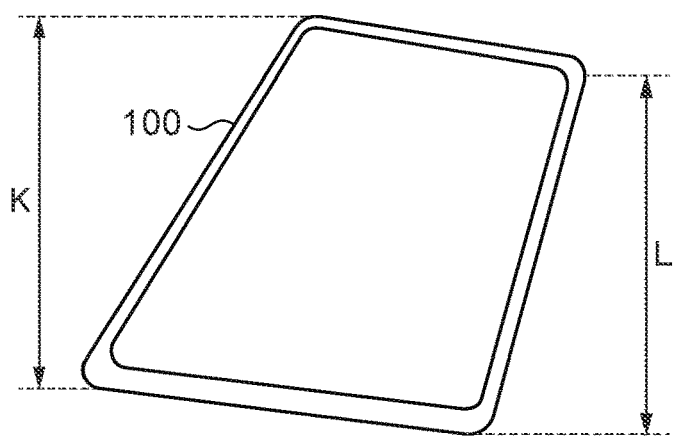

FIG. 5B is a schematic view showing a method of detecting a tilt of the smartphone 100 in the horizontal rotational direction. The horizontal rotational direction of the smartphone 100 refers to a direction of rotation about an axis perpendicular to the horizontal plane. The tilt of the smartphone 100 in the horizontal rotational direction is obtained by a ratio between a length "K" of a left side and a length "L" of a right side of the smartphone 100. For example, in a case where K=7 and L=6 are detected, the tilt in the horizontal rotational direction is determined as K:L=7:6.

Figure 5C:
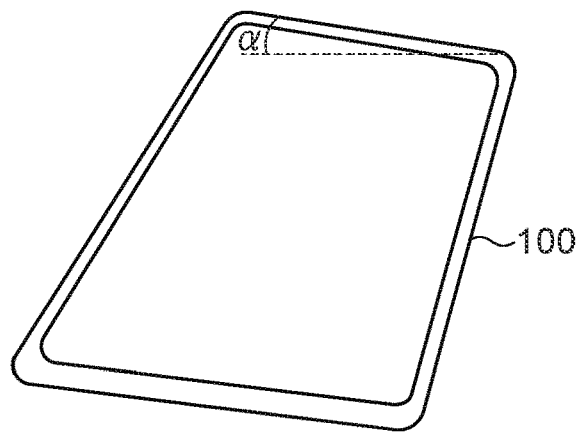

FIG. 5C is a schematic view showing a method of detecting a tilt of the smartphone 100 in the rotational axis direction. The tilt of the smartphone 100 in the rotational axis direction is defined as an angle "α" by which the upper side of the smartphone 100 is tilted with respect to the horizontal plane. For example, in a case where the tilt of the upper side of the smartphone 100 with respect to the horizontal plane is detected as 30 degrees, the tilt of the smartphone 100 in the rotational axis direction is determined as α=30 degrees.

In the first embodiment, a mode of the virtual object displayed on the right display section 204R is controlled based on information on the distance, position, and tilts of the smartphone 100 with respect to the smart glasses 110, detected from an image of the smartphone 100 captured by the image capturing section 203.

Figure 6A:
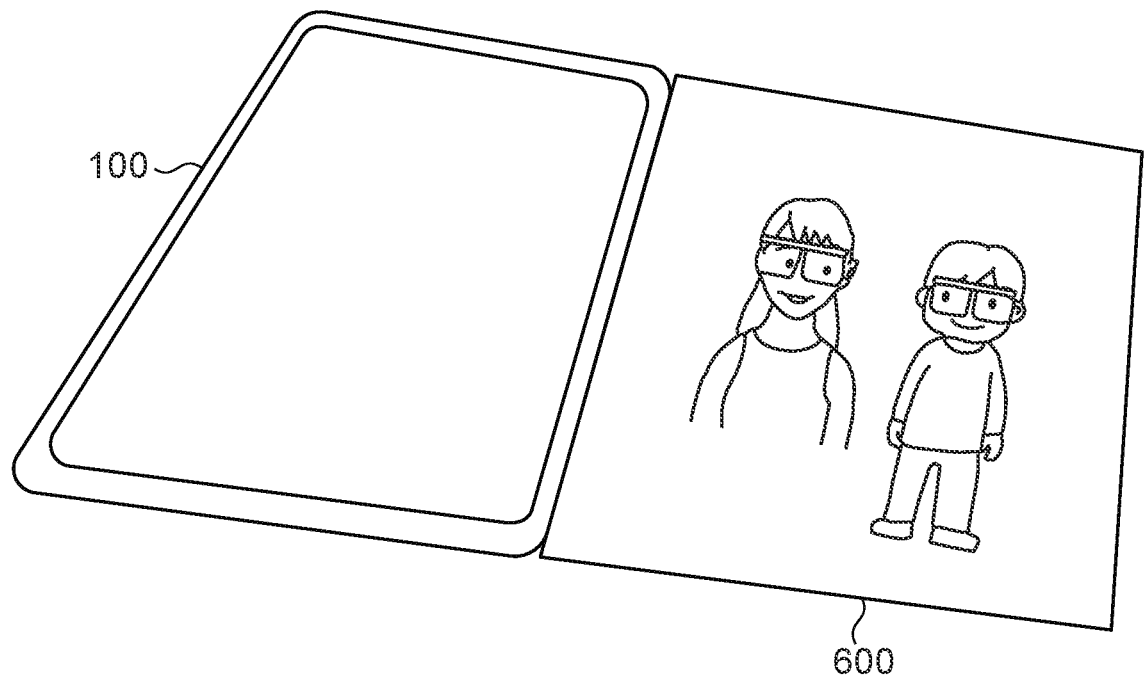
FIGS. 6A and 6B are views showing an example of the display of a virtual object in the first embodiment.
Figure 6B:
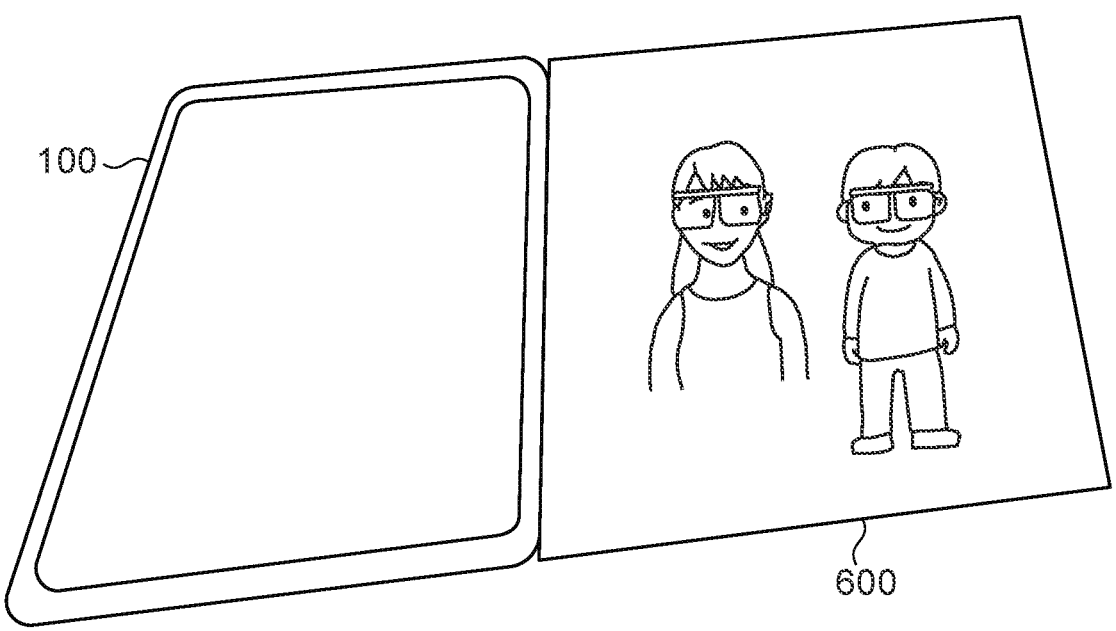

FIGS. 6A and 6B are views each showing an example of display of the virtual object 600 on the right display section 204R, with respect to the smartphone 100 viewed through the right display section 204R of the smart glasses 110. The virtual object 600 is displayed on the right display section 204R such that the virtual object 600 is in contact with or close to the right side of the smartphone 100, with reference to the coordinates 402 (see FIG. 4) of the smartphone 100 directly viewed through the right display section 204R formed of a material having a high translucency.

The distance detection section 301, the position detection section 302, and the tilt detection section 303 sequentially acquire images of the smartphone 100 captured by the image capturing section 203 and continue to detect therefrom the information on the distance, position, and tilts of the smartphone 100 with respect to the smart glasses 110. Then, as shown in FIGS. 6A and 6B, the display mode of the virtual object 600 on the right display section 204R is controlled in accordance with changes in distance, position, and posture of the smartphone 100 with respect to the smart glasses 110. Details of this control will be described hereafter with reference to FIGS. 7 and 8.

Figure 7:
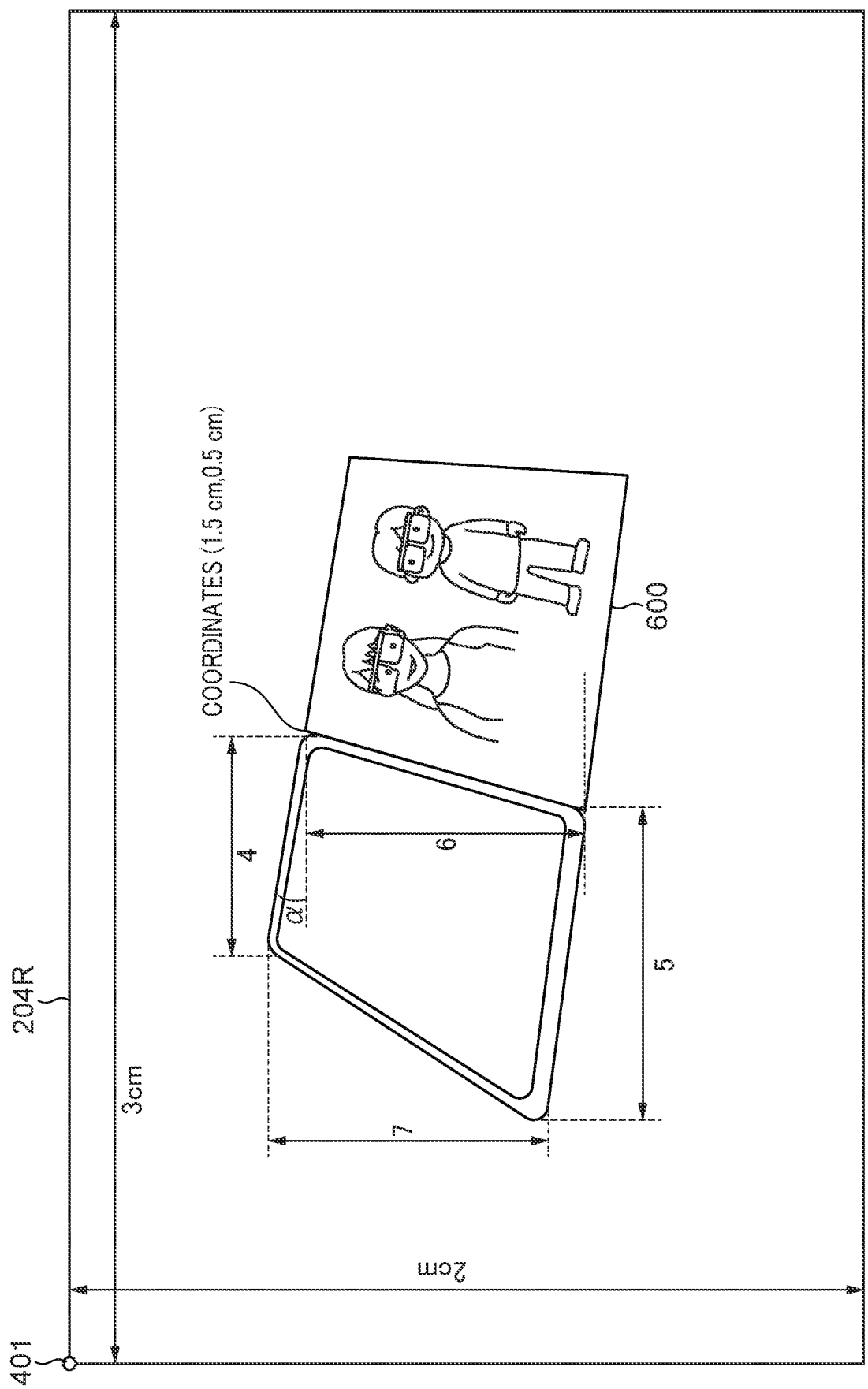
FIG. 7 is a schematic view useful in explaining a method of displaying a virtual object in the first embodiment.

FIG. 7 is a schematic view useful in explaining the method of displaying the virtual object 600 on the right display section 204R of the smart glasses 110 by the display controller 304. The display controller 304 controls the display mode of the virtual object 600 on the right display section 204R based on the information on the distance, position, and tilts of the smartphone 100 with respect to the smart glasses 110.

For example, in a case where the distance information of the smartphone 100 indicates 50 cm, the display controller 304 controls the display to arrange the virtual object 600 such that the virtual object 600 appears in a position at 50 cm from a viewpoint of the smart glasses 110. Then, the display controller 304 performs affine transformation on the virtual object 600 such that the respective tilts of the virtual object 600 in the vertical rotational direction and the horizontal rotational direction become the same as the respective tilts of the smartphone 100 in the vertical rotational direction and the horizontal rotational direction. For example, if the tilt of the smartphone 100 in the vertical rotational direction is represented by "M:N=5:4", the display controller 304 performs affine transformation on the virtual object 600 such that the ratio between the lower side and upper side of the virtual object 600 becomes "5:4". Further, if the tilt of the smartphone 100 in the horizontal rotational direction is represented by "K:L=7:6", the display controller 304 performs affine transformation on the virtual object 600 such that the ratio between the left side and right side of the virtual object 600 becomes "7:6". Further, the display controller 304 performs rotation processing on the virtual object 600 having been subjected to affine transformation, such that the tilt in the rotational axis direction becomes the same as the tilt of the smartphone 100 in the rotational axis direction. For example, if the angle of the smartphone 100 in the rotational axis direction is 30 degrees, the display controller 304 rotates the vector of the virtual object 600 having been subjected to affine transformation through 30 degrees.

The display controller 304 controls the virtual object 600 to be disposed in the right display section 204R such that the coordinates of the upper left corner of the virtual object 600 are made to coincide with or close to the coordinates 402 of the smartphone 100. At this time, the virtual object 600 is displayed on the right display section 204R such that the upper side and lower side thereof each form substantially one straight line with the upper side and lower side of the smartphone 100, respectively. In other words, the length of the left side of the virtual object 600 is set to be substantially equal to the length of the right side of the smartphone 100. Thus, the display mode shown in FIG. 7 is obtained.

Figure 8:
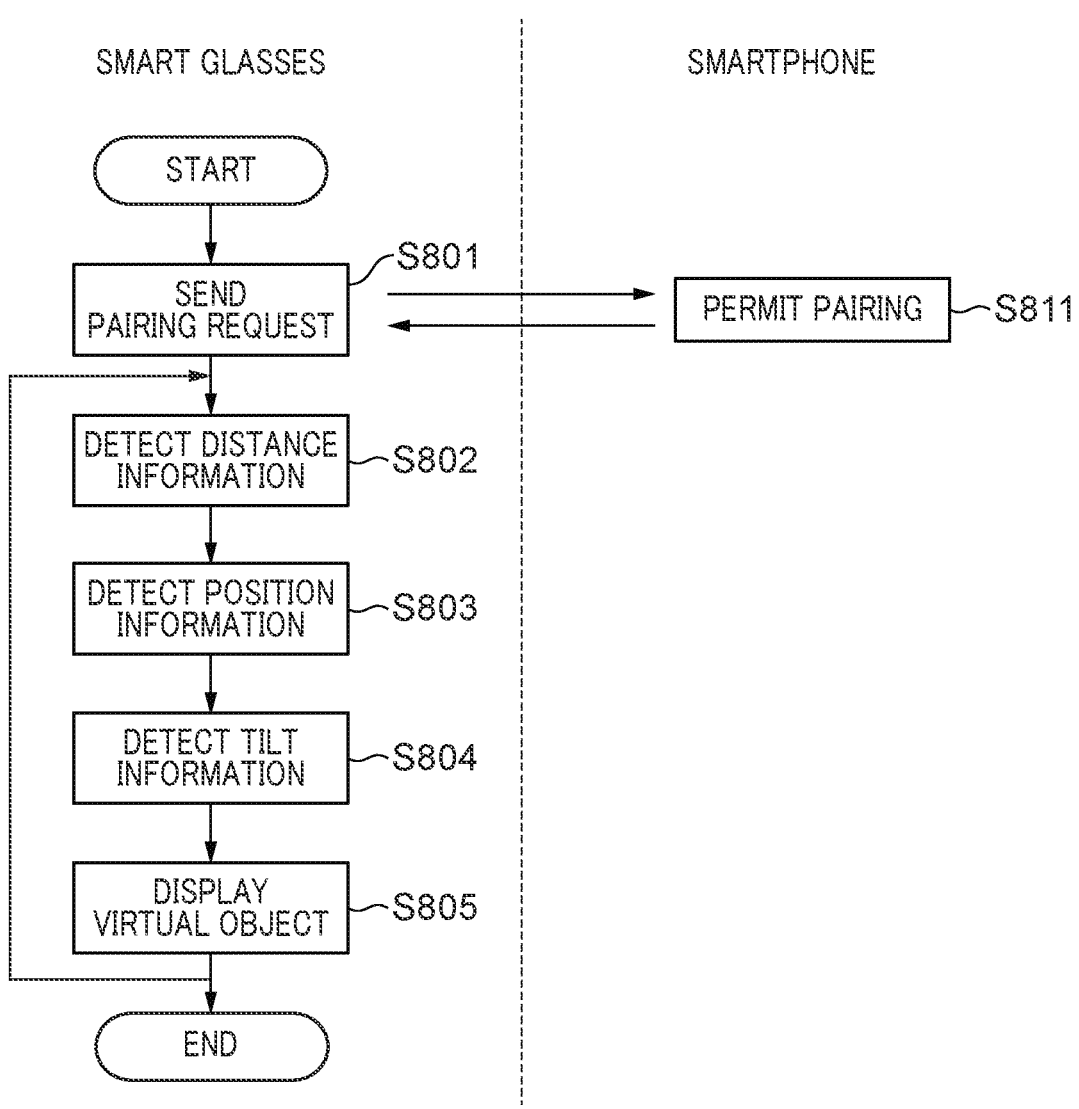
FIG. 8 is a flowchart of a control process of the display system in the first embodiment.

FIG. 8 is a flowchart of a process executed by the smartphone 100 and the smart glasses 110, for controlling the display mode of the virtual object 600 according to an operation on the smartphone 100. In the process in FIG. 8, each processing (step) denoted by an S number with respect to the smart glasses 110 is realized by the CPU of the smart glasses 110 that loads a predetermined program stored in the ROM into the RAM to control the operations of the components of the smart glasses 110.

The present process is started when the smart glasses 110 are powered on by a user's operation performed on the operation section provided on the smart glasses 110, thereby enabling the display of a virtual object on the display section 204. It is assumed that when the process is started for the smart glasses 110, the smartphone 100 has been powered on.

In a step S801, the CPU sends a pairing request to the smartphone 100 according to a user's operation. The user's operation performed in this step may be an operation performed on the operation section or a user's gesture an image of which is captured by the image capturing section 203. In a step S811, the smartphone 100 is assumed to permit the pairing in response to the pairing request received in the step S801. Although not shown in the block diagram of the smartphone 100, the process performed in the smartphone 100 is realized by the CPU of the smartphone 100 that executes a predetermined program to control the components of the smartphone 100. Note that the smartphone 100 and the smart glasses 110 are paired because, for example, in a case where a plurality of smartphones appear within an image captured by the image capturing section 203, a smartphone that has been paired can be identified.

In a step S802, the distance detection section 301 detects distance information of the smartphone 100 from an image of the smartphone 100 captured by the image capturing section 203. Note that the first embodiment aims to operate the virtual object 600 from the smartphone 100, and hence it is assumed that the user is directly viewing the smartphone 100 through the display section 204. Further, it is assumed that the smartphone 100 appears in the image captured by the image capturing section 203. Further, in a case where the control unit 202 analyzes (performs image processing of) the captured image before execution of the step S802, and it is detected as a result of the analysis that the smartphone 100 (display section 101) does not appear in the captured image, the present process may be terminated.

In a step S803, the position detection section 302 detects the position information of the smartphone 100, i.e. the coordinates 402 of the upper right corner of the smartphone 100, from the image of the smartphone 100 captured by the image capturing section 203. In a step S804, the tilt detection section 303 detects from the image of the smartphone 100 captured by the image capturing section 203, a tilt in the vertical rotational direction, a tilt in the horizontal rotational direction, and a tilt in the rotational axis direction, as the tit information of the smartphone 100. In a step S805, the display controller 304 displays the virtual object 600 on the display section 204 (right display section 204R) based on the information on the distance, position, and tilts of the smartphone 100, obtained in the steps S802 to S804.

The display of the virtual object 600 is continued until the smart glasses 110 are powered off e.g. by a user's operation. Until the smart glasses 110 are powered off, the processing for acquiring the information on the position and posture of the smartphone 100 and the processing for displaying the virtual object 600 (steps S802 to S805) are repeatedly executed. That is, the display controller 304 continues to display the virtual object in a position adjacent to the smartphone 100 while changing the shape of the virtual object according to changes in position and posture of the smartphone 100.

Thus, in the first embodiment, the control unit 202 continues to detect the information on the distance, position, and tilts of the smartphone 100, and display the virtual object on the display section 204 based on these items of the information. With this, the user can appreciate the virtual object while changing the display mode of the virtual object by changing the posture and position of the smartphone 100 in a state in which the user can directly view the smartphone 100.

Note that although in the first embodiment, the information on the distance, position, and tilts of the smartphone 100 is detected by the smart glasses 110, this is not limitative. For example, in a case where the smartphone 100 has a variety of tilt information items obtained using e.g. a gyro sensor, the smartphone 100 may provide these tilt information items to the smart glasses 110. Further, as for the distance information and position information of the smartphone 100, in a case where the smartphone 100 has a ranging function, such as a LIDAR, the smartphone 100 may also provide the distance information and position information to the smart glasses 110.

Further, although in the first embodiment, the virtual object is displayed in a position adjacent to the right side of the smartphone 100 which can be directly viewed through the display section 204, the display position of the virtual object is not limited to this. For example, the virtual object may be displayed in a position adjacent to the left side of the smartphone 100. Further, the virtual object 600 may be displayed such that part or whole of the virtual object 600 is superimposed on the display section 101 of the smartphone 100.

Next, a second embodiment of the present invention will be described. A display system according to the second embodiment has the same basic configuration as the display system according to the first embodiment but is different in the configuration of the control unit 202 included in the smart glasses 110. Therefore, the configuration and functions of the control unit 202 will be mainly described, for describing the configuration and the control of the display system according to the second embodiment. Note that out of the components of the display system according to the second embodiment, components which are substantially the same as those of the display system according to the first embodiment are denoted by the same names and reference numerals, and the redundant description is omitted.

Figure 9:
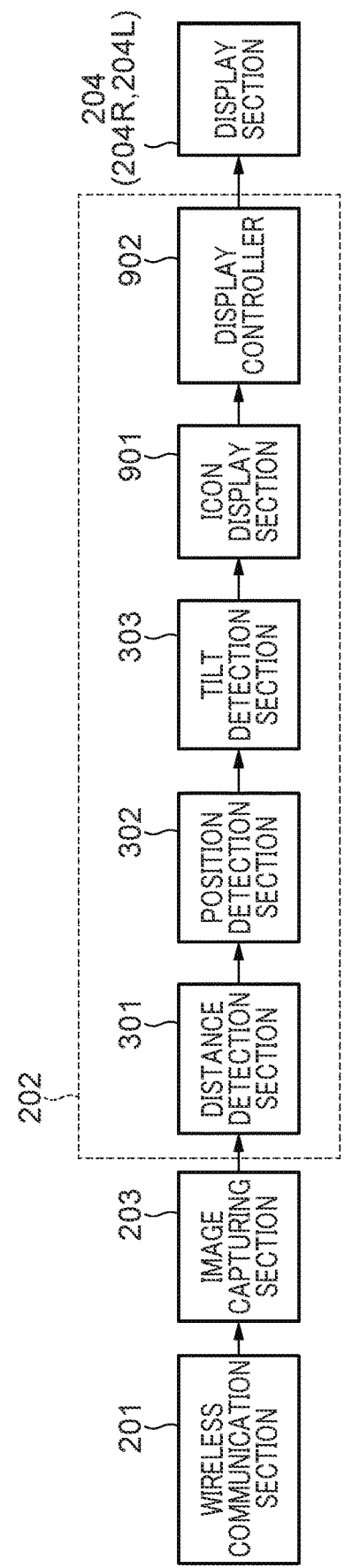
FIG. 9 is a schematic block diagram of smart glasses as a component of a display system according to a second embodiment.

FIG. 9 is a schematic block diagram of the smart glasses 110 as a component of the display system according to the second embodiment. The smart glasses 110 include the wireless communication section 201, the control unit 202, the image capturing section 203, and the display section 204. The control unit 202 is equipped with functions of the distance detection section 301, the position detection section 302, the tilt detection section 303, an icon displaying section 901, and a display controller 902. The functions of the distance detection section 301, the position detection section 302, and the tilt detection section 303 are the same as the functions described in the first embodiment, and hence description thereof is omitted here.

The icon displaying section 901 performs control for disposing an icon on the smartphone 100, which is used for operating the virtual object displayed on the display section 204. That is, the icon displaying section 901 requests the smartphone 100 to display the icon for operating the virtual object on the display section 101. The smartphone 100 having received this request sends a notification for permitting the display of the requested icon to the icon displaying section 901 as a response and displays the icon for operating the virtual object on the screen of the smartphone 100.

Note that an application (software) for displaying the icon for operating the virtual object on the display section 101 has been stored in the smartphone 100 in advance or acquired from an external device via the wireless communication path 120. For example, the application makes it possible to move a cursor displayed in the virtual object 600 by a user's flick operation on the icon and partially enlarge the virtual object 600 by a user's double-tap operation on the icon.

The operation performed on the icon disposed on the display section 101 of the smartphone 100 is converted to electrical signals and the electrical signals are transmitted to the display controller 902 of the smart glasses 110. The display controller 902 receives the electrical signals indicating the user's operation performed on the icon displayed on the display section 101 of the smartphone 100, and controls movement of the cursor displayed in the virtual object and the enlargement/reduction and so forth of the virtual object according to the received electrical signals.

Figure 10A:
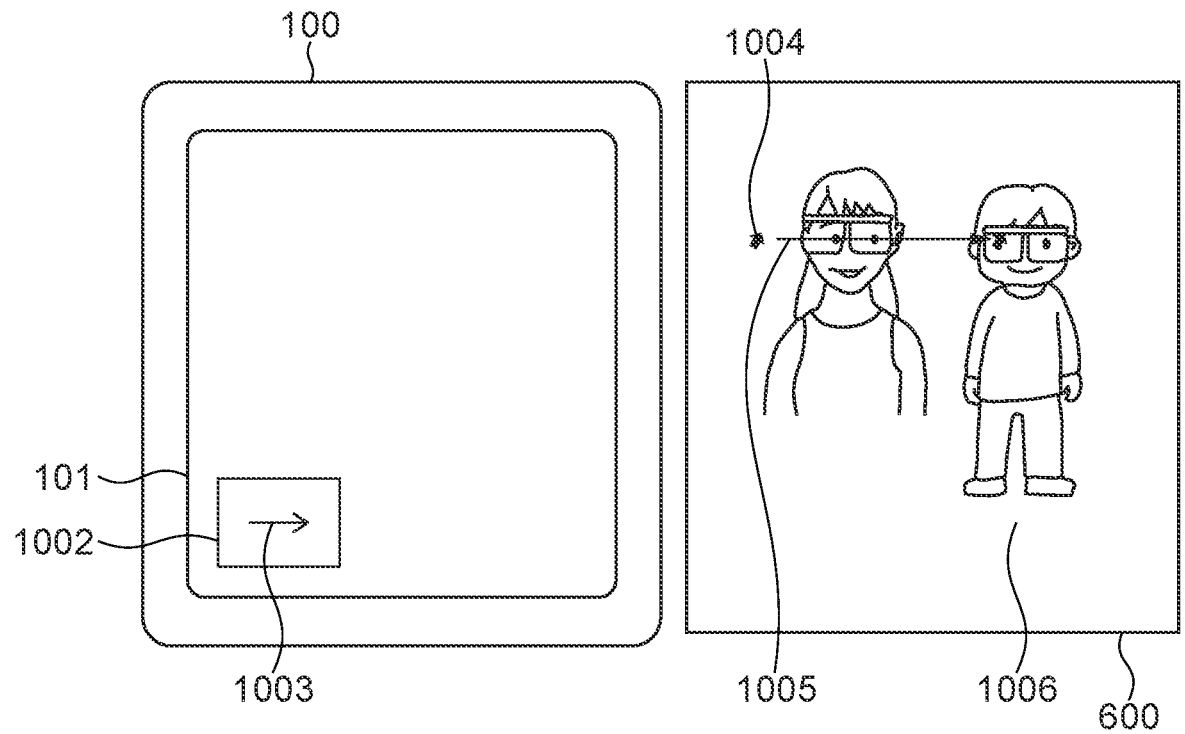
FIGS. 10A and 10B are schematic views useful in explaining a relationship between an example of screen display on the smartphone and a virtual object displayed on a display section of the smart glasses in the second embodiment.
Figure 10B:
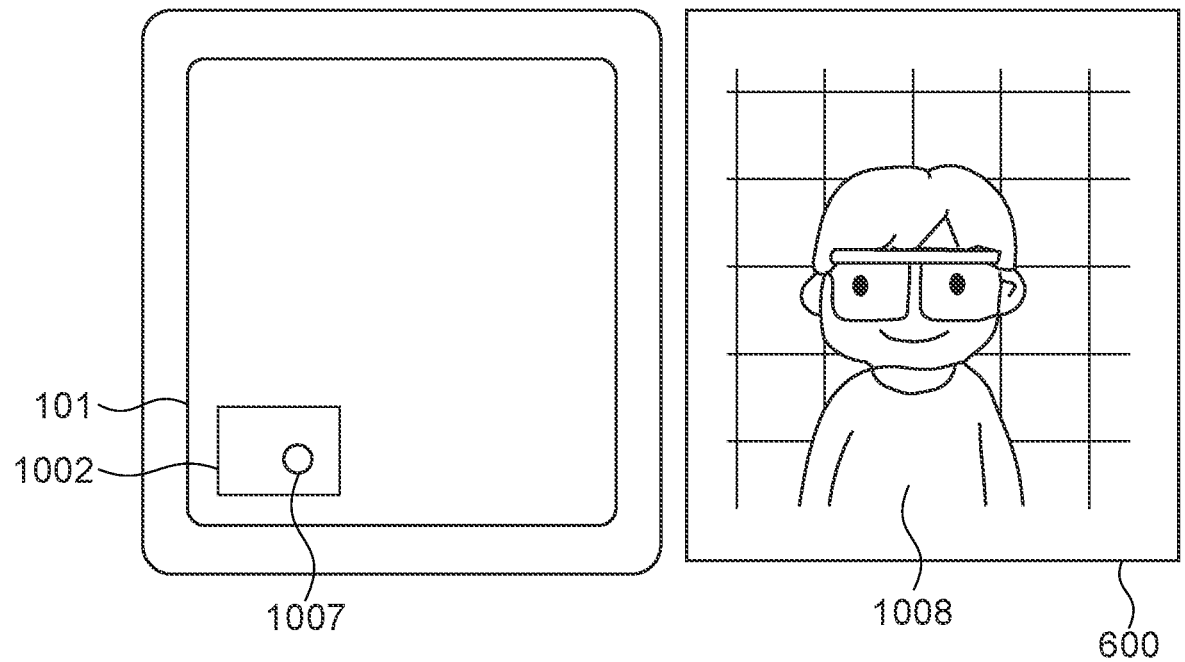

FIGS. 10A and 10B are schematic views useful in explaining a relationship between an example of the screen display on the smartphone 100 and the virtual object 600 displayed on the display section 204 of the smart glasses 110. Note that in FIGS. 10A and 10B, the display of the display section 204 is omitted.

Referring to FIG. 10A, an icon 1002 for operating the virtual object 600 is disposed (displayed) at the lower left of the display section 101 of the smartphone 100. An arrow 1003 indicated within the icon 1002 schematically shows an operating direction of a user's finger (note that the arrow 1003 itself is not displayed), and FIG. 10A shows a state in which a flick operation from the left side to the right side is performed on the icon 1002.

In the virtual object 600 appearing in FIG. 10A, the display controller 902 moves a cursor 1004 on the virtual object 600 from the left side to the right side as indicated by an arrow 1005 based on the flick operation performed on the icon 1002 from the left side to the right side. As a result, the cursor 1004 is moved onto a person 1006 on the right side.

Referring to FIG. 10B, a circle 1007 illustrated within the icon 1002 schematically indicates a double-tap operation of a user's finger. It is assumed that after the flick operation has been performed on the icon 1002 in FIG. 10A, the user has performed the double-tap operation on the icon 1002 as shown in FIG. 10B. With this, since the cursor 1004 has been moved onto the person 1006 by the flick operation in FIG. 10A, an area where the cursor 1004 is positioned on the person 1006 is displayed in an enlarged manner. Thus, FIG. 10B shows a state in which only a body upper half 1008 of the person 1006 is displayed as the virtual object 600.

Figure 11:
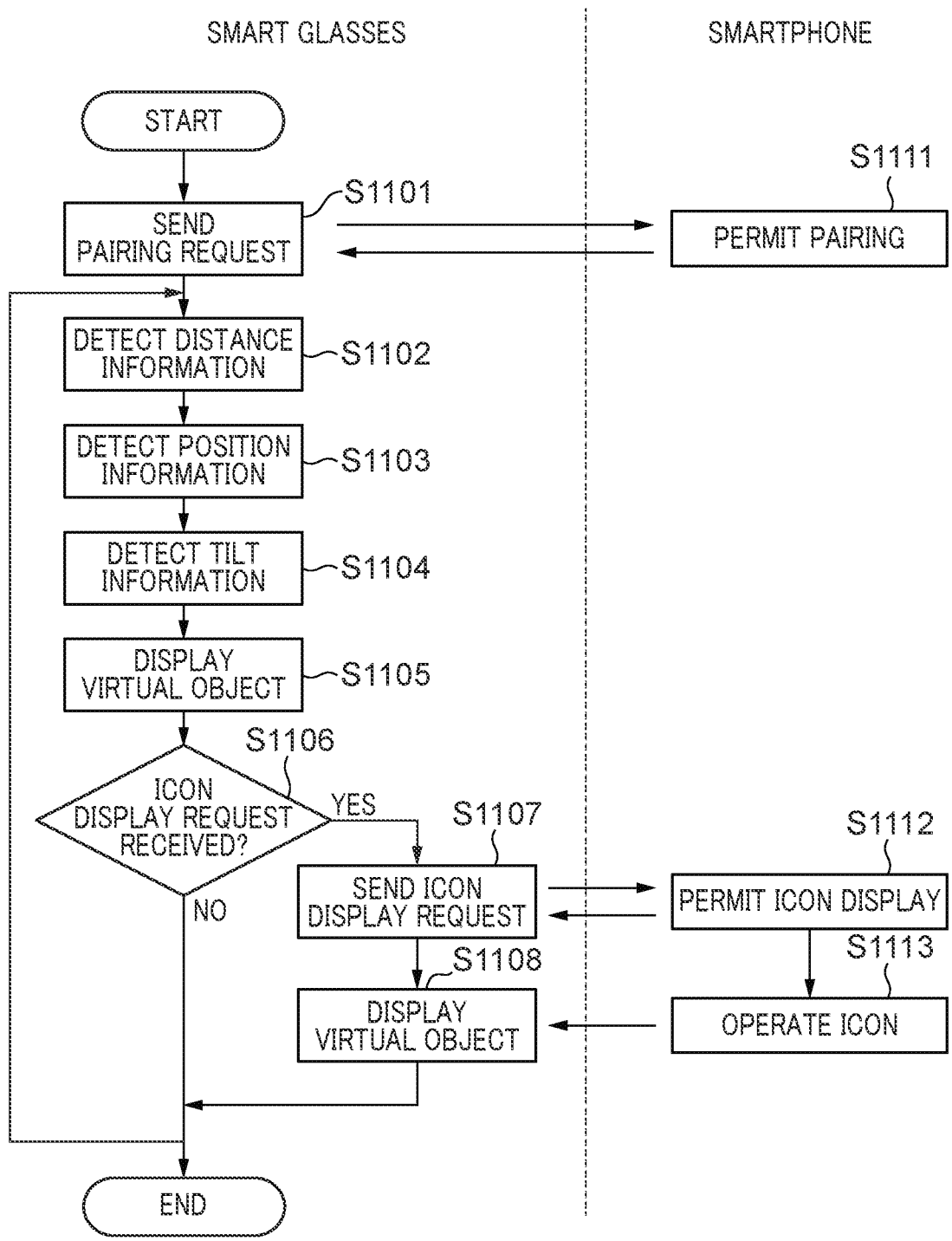
FIG. 11 is a flowchart of a control process of the display system in the second embodiment.

FIG. 11 is a flowchart of a process executed by the smartphone 100 and the smart glasses 110 so as to make it possible to operate the virtual object 600 by an operation performed on the icon 1002. In the process in FIG. 11, each processing (step) denoted by an S number for the smart glasses 110 is realized by the CPU of the smart glasses 110 that loads a predetermined program stored in the ROM into the RAM to control the operations of the components of the smart glasses 110. Further, each processing (step) denoted by an S number for the smartphone 100 is realized by the CPU of the smartphone 100 that executes a predetermined program to control the operations of the components of the smartphone 100.

The present process is started when the smart glasses 110 are powered on by a user's operation performed on the operation section provided on the smart glasses 110, thereby enabling the display of a virtual object on the display section 204. Note that it is assumed that when the process is started for the smart glasses 110, the smartphone 100 has already been powered on. Further, steps S1101 to S1105 and S1111 are the same as the steps S801 to S805 and S811 in FIG. 8, and hence description thereof is omitted.

In a step S1106 following the step S1105, the control unit 202 (CPU) determines whether or not an icon display request by a user's operation has been received. The user's operation performed in this step may be an operation performed on the operation section or a user's gesture of which an image is captured by the image capturing section 203. If it is determined that an icon display request has not been received (NO to the step S1106), the control unit 202 continues, similar to the first embodiment, to display the virtual object 600 until the smart glasses 110 are powered off e.g. by a user's operation. Until the smart glasses 110 are powered off, the processing for acquiring the information on the position and posture of the smartphone 100 and the processing for displaying the virtual object 600 (steps S1102 to S1105) are repeatedly executed.

If it is determined that an icon display request has been received (YES to the step S1106), the control unit 202 proceeds to a step S1107. In the step S1107, the icon displaying section 901 sends an icon display request to the smartphone 100. In a step S1112, the CPU of the smartphone 100 permits the display of the icon in response to the icon display request and sends a response indicating the permission of display of the icon, to the icon displaying section 901. Then, in a step S1113, the CPU of the smartphone 100 displays the icon 1002 on the display section 101. This enables the user to operate the icon 1002.

In the smart glasses 110, in a step S1108, the display controller 902 displays the virtual object 600 on the display section 204 according to the response of the permission of the icon display to the icon display request sent in the step S1107. At this time, as shown in FIG. 10A, the cursor 1004 is displayed on the virtual object 600 in a superimposed manner. The process after the step S1108 is the same as the process performed in a case where the answer to the question of the step S1106 is negative (NO), and hence description thereof is omitted.

Thus, in the second embodiment, the icon for operating the virtual object displayed on the display section 204 is displayed on the display section 101 of the smartphone 100 to make it possible to operate the virtual object by a user's operation performed on the icon. This enables the user to intuitively operate the virtual object on the smartphone 100 directly viewed via the display section 204 without touching the display section 204 on which the virtual object is displayed. That is, it is possible to easily operate the virtual object while ensuring visibility of the smartphone 100 and the virtual object.

The display position of the icon 1002 is not limited to the lower left of the display section 101, and the size of the icon 1002 is not limited insofar as the icon can be easily operated by a user. Further, the number of icons displayed on the display section 101 is not limited to one, but a plurality of icons (such as icons dedicated for performing predetermined respective operations) may be displayed. The operations which can be executed on the icon 1002 are not limited to the flick and double-tap operations, and further, these operations are not necessarily required, but the operations may be any of single-tap, swipe, pinch-in, pinch-out, and like other operations.

Next, a third embodiment of the present invention will be described. A display system according to the third embodiment has has the same basic configuration as the display system according to the first embodiment but is different in the configuration of the control unit 202 included in the smart glasses 110. Therefore, the configuration and functions of the control unit 202 will be mainly described, for describing the configuration and the control of the display system according to the third embodiment. Note that out of the components of the display system according to the third embodiment, components which are substantially the same as those of the display system according to the first embodiment are denoted by the same names and reference numerals, and the redundant description is omitted.

Figure 12:
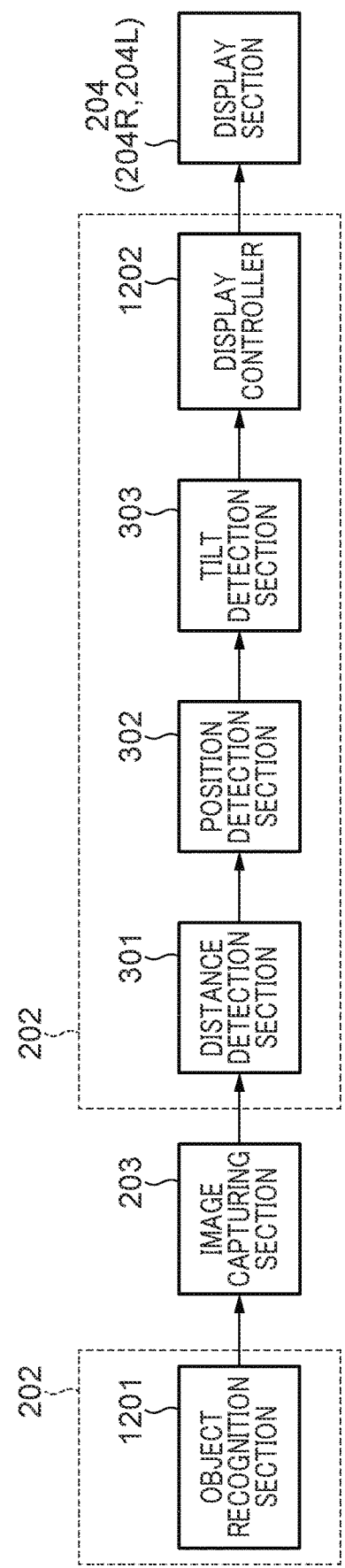
FIG. 12 is a schematic block diagram of smart glasses as a component of a display system according to a third embodiment.

FIG. 12 is a schematic block diagram of the smart glasses 110 as a component of the display system according to the third embodiment. The smart glasses 110 include the control unit 202, the image capturing section 203, and the display section 204. The control unit 202 is equipped with functions of an object recognition section 1201, the distance detection section 301, the position detection section 302, the tilt detection section 303, and a display controller 1202. The functions of the distance detection section 301, the position detection section 302, and the tilt detection section 303 are the same as the functions described in the first embodiment, and hence description thereof is omitted here.

In the third embodiment, the smartphone 100 is in a power-off state and pairing with the smart glasses 110 has not been performed yet. On the other hand, the object recognition section 1201 recognizes the smartphone 100 by detecting a user's specific operation, such as a double-tap operation, performed on the smartphone 100, from an image acquired via the image capturing section 203.

Here, it is envisaged that there arises a situation in which a tilt of the smartphone 100 in the vertical rotational direction, a tilt in the horizontal rotational direction, and a tilt in the rotational axis direction, detected by the tilt detection section 303, become larger than tilt threshold values set in advance, respectively. In this case, the display controller 1202 invalidates the tilt information detected by the tilt detection section 303 and normally displays the virtual object on the display section 204 without causing the user to touch the smartphone 100.

The operation of normally displaying the virtual object refers to an operation of displaying the virtual object on the display section 204 in a positional relationship in which a line connecting the right eye and left eye of the user wearing the smart glasses 110 and the upper side or lower side of the virtual object are substantially parallel to each other. For example, in a case where the angle α of the smartphone 100 in the rotational axis direction, detected by the tilt detection section 303, is larger than the tilt threshold value set in advance, the virtual object is displayed on the display section 204 without rotating the vector of the virtual object in the rotational axis direction. Note that the tilt threshold value set in advance may be a value set for the smart glasses 110 as a default value or may be a value set by a user.

Figure 13:
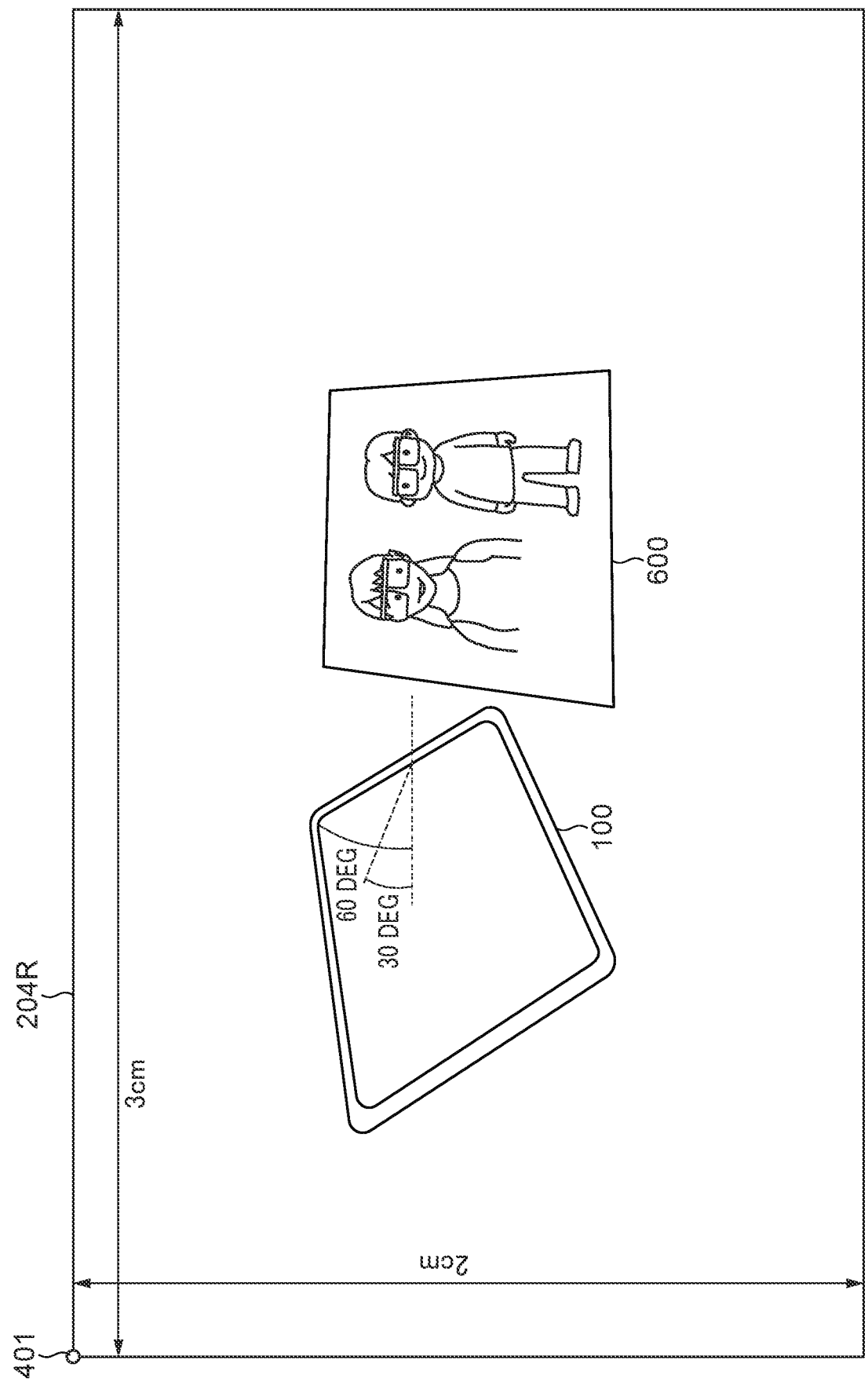
FIG. 13 is a view showing an example of the display of a virtual object in the third embodiment.

FIG. 13 is a view showing an example of the display of the virtual object 600 displayed by the display controller 1202, and shows a state in which the smartphone 100 is tilted in the rotational axis direction through 60 degrees.

Let it be assumed, for example, that in a case where the tilt threshold value is set to 30 degrees, the smartphone 100 is tilted in the rotational axis direction from a state tilted by 20 degrees to a state tilted by 60 degrees. In this case, while the tilt angle in the rotational axis direction is changed from 20 degrees up to 30 degrees, the virtual object 600 is subjected to vector rotation in the rotational axis direction according to the tilt of the smartphone 100 in the rotational axis direction. Then, when the tilt angle in the rotational axis direction exceeds 30 degrees, the display state in which the virtual object is tilted in the rotational axis direction through 30 degrees is maintained without further subjecting the virtual object 600 to vector rotation. Therefore, the display of the virtual object 600 is not changed after the tilt angle of the smartphone 100 in the rotational axis direction exceeds 30 degrees and until it reaches 60 degrees.

This makes it possible to prevent the virtual object 600 from being displayed on the display section 204 in a state in which the user is difficult to recognize the contents of the virtual object 600. Note that threshold values (a threshold value of a ratio between the upper side and the lower side, and a threshold value of a ratio between the left side and the right side) are also set for the tilt in the vertical rotational direction and the tilt in the horizontal rotational direction, respectively, and the display control is similarly performed.

FIG. 14 is a flowchart useful in explaining the display control for restricting the tilt of the virtual object 600. In the process in FIG. 14, each processing (step) denoted by an S number is realized by the CPU of the smart glasses 110 that loads a predetermined program stored in the ROM into the RAM to control the operations of the components of the smart glasses 110.

The present process is started when the smart glasses 110 are powered on by a user's operation performed on the operation section provided on the smart glasses 110 and thereby enabling the display of a virtual object on the display section 204. In a step S1401, the object recognition section 1201 recognizes the smartphone 100 as an object. Steps S1402 to S1404 are the same as the steps S802 to S804 in FIG. 8, and hence description thereof is omitted.

In a step S1405, the display controller 1202 determines whether or not each of the tilts in the vertical rotational direction, the horizontal rotational direction, and the rotational axis direction, detected with respect to the smartphone 100 recognized in the step S1401, is larger than the associated tilt threshold value set to each tilt in advance.

If the detected tilts are not larger than the associated tilt threshold values, respectively (NO to the step S1405), the display controller 1202 proceeds to a step S1406. The step S1406 et seq. are the same as the step S805 et seq. in FIG. 8, and hence description thereof is omitted. On the other hand, if any of the tilts detected is larger than the associated tilt threshold value (YES to the step S1405), the display controller 1202 proceeds to a step S1407. In the step S1407, the display controller 1202 displays the virtual object 600 on the display section 204 by canceling (invalidating) the information on the tilt determined to be larger than the associated tilt threshold value. The process after the step S1407 is the same as the process after the step S1406, and hence description thereof is omitted.

Thus, in the third embodiment, the smartphone 100 which has not been paired is recognized, and if a tilt detected with respect to the recognized smartphone 100 is larger than the associated tilt threshold value, the detected tilt is determined to be invalidated. This makes it possible to control the display mode of the virtual object according to the operation of the smartphone 100 visually recognized through the display section 204, and display the virtual object on the display section 204 in a state in which the user can always easily recognize the contents of the virtual object at the time.

Note that restriction of change of the shape of the virtual object in the third embodiment can be also applied to the display control of the virtual object in a state in which the smartphone 100 and the smart glasses 110 have been paired as in the first embodiment.

The present invention has been described heretofore based on the embodiments thereof. However, the present invention is not limited to these embodiments, but it is to be understood that the invention includes a variety of forms within the scope of the gist of the present invention. Further, the embodiments of the present invention are described only by way of example, and it is possible to combine the embodiments on an as-needed basis.

For example, although in the above-described embodiments, the smart glasses 110 as an example of the optical transmission type (optical see-through type) HMD has been described as the display device, a video see-through type HMD may be used in place of this. A display section of the video see-through type HMD, which corresponds to lenses of general glasses, is not transparent. Therefore, in a case where the video see-through type HMD is used, a display image generated by superimposing an image of a virtual object on a real image captured by an image capturing section is displayed on the display section in a manner visually recognizable by a user.

Further, although in the above-described embodiments, the smartphone 100 is detected from an image captured by the image capturing section 203 by the control unit 202 of the smart glasses 110, this detection may be performed by the control unit 312 of the smartphone 100. That is, the smartphone 100 may receive (image data of) an image captured by the image capturing section 203, using the wireless communication section 311, and the control unit 312 may perform detection of the smartphone 100 from the received image, whereafter the detection result may be transmitted from the wireless communication section 311 to the smart glasses 110. This method is effective in a case where the processing capability of the control unit 312 of the smartphone 100 is higher than the processing capability of the control unit 202 of the smart glasses 110.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-015070, filed Feb. 2, 2021, which is hereby incorporated by reference herein in its entirety.

What is claimed is:

1. A display system including comprising:
an information processing apparatus;
a head mounted display that is capable of communicating with the information processing apparatus and that comprises an image capturing unit and a display section;
a detection unit configured to detect information on the information processing apparatus from an image captured by the image capturing unit; and
a display control unit configured to display a virtual object on the display section in a position adjacent to the information processing apparatus or in a manner partially superimposing the virtual object on the information processing apparatus, based on the information,
wherein the information processing apparatus comprises a display configured to display an icon for performing an operation on the virtual object, and
wherein the display control unit is configured to control display of the virtual object on the display section according to a signal indicative of an operation performed on the icon, which is received from the information processing apparatus.

2. The display system according to claim 1, wherein the head mounted display comprises the detection unit.

3. The display system according to claim 1, wherein the detection unit includes:
   a distance detection unit configured to detect distance information of a distance from the head mounted display to the information processing apparatus;
   a position detection unit configured to detect position information of the information processing apparatus relative to the head mounted display; and
   a tilt detection unit configured to detect tilt information of the information processing apparatus.

4. The display system according to claim 3, wherein the distance detection unit is configured to detect the distance information of the distance from the head mounted display to the information processing apparatus, from the image captured by the image capturing unit,
   wherein the position detection unit is configured to detect the position information of the information processing apparatus relative to the head mounted display, from the image, and
   wherein the tilt detection unit is configured to detect the tilt information of the information processing apparatus, from the image.

5. The display system according to claim 3, wherein the distance detection unit is configured to acquire the distance information of the distance from the information processing apparatus to the head mounted display, which is detected by the information processing apparatus, from the information processing apparatus by communication,
   wherein the position detection unit is configured to acquire the position information of the information processing apparatus relative to the head mounted display, which is detected by the information processing apparatus, from the information processing apparatus by communication, and
   wherein the tilt detection unit is configured to acquire the tilt information of the information processing apparatus, which is detected by the information processing apparatus, from the information processing apparatus by communication.

6. The display system according to claim 3, wherein in a case where a tilt of the information processing apparatus is larger than a predetermined threshold value, the display control unit is configured to cancel the tilt information and to display the virtual object on the display section.

7. The display system according to claim 1, wherein the display control unit is configured to continue to display the virtual object on the display section in the position adjacent to the information processing apparatus or in the manner partially superimposing the virtual object on the information processing apparatus, while following changes in the information.

8. The display system according to claim 1, wherein the information processing apparatus has a substantially rectangular shape, when viewed from a predetermined direction, and
   wherein the display control unit is configured to display the virtual object on the display section, by changing a shape of the virtual object based on the information, such that a ratio between an upper side and a lower side of the virtual object and a ratio between a left side and a right side of the virtual object become equal to a ratio between an upper side and a lower side of the information processing apparatus and a ratio between a left side and a right side of the information processing apparatus, respectively.

9. The display system according to claim 1, wherein the head mounted display comprises an object recognition unit configured to identify, in a case where (a) it is impossible to communicably connect between the head mounted display and the information processing apparatus, and (b) also it is detected from an image captured by the image capturing unit that a predetermined gesture has been performed on the information processing apparatus, the information processing apparatus on which the gesture has been performed, as the information processing apparatus adjacent to which the virtual object is to be displayed on the display section or partially superimposed on which the virtual object is to be displayed on the display section.

10. A head mounted display that is capable of communicating with an information processing apparatus, the head mounted display comprising:
    an image capturing unit;
    a display section; and
    a display control unit configured to display a virtual object on the display section in a position adjacent to the information processing apparatus or in a manner partially superimposing the virtual object on the information processing apparatus, based on information on the information processing apparatus, which is detected from an image captured by the image capturing unit,
    wherein the information processing apparatus comprises a display configured to display an icon for performing an operation on the virtual object, and
    wherein the display control unit is configured to control display of the virtual object on the display section according to a signal indicative of an operation performed on the icon, which is received from the information processing apparatus.

11. The head mounted display according to claim 10, further comprising a detection unit configured to detect the information,
    wherein the detection unit includes:
    (1) a distance detection unit configured to detect distance information of a distance from the head mounted display to the information processing apparatus,
    (2) a position detection unit configured to detect position information of the information processing apparatus relative to the head mounted display, and
    a tilt detection unit configured to detect tilt information of the information processing apparatus.

12. The head mounted display according to claim 10, further comprising a request unit configured to request the information processing apparatus to display the icon on the display of the information processing apparatus by communication.

13. A method of controlling a display system, the display system comprising (a) an information processing apparatus, and (b) a head mounted display that is capable of communicating with the information processing apparatus and that comprises an image capturing unit and a display section, the method comprising:
    detecting information on the information processing apparatus from an image captured by the image capturing unit; and
    displaying a virtual object on the display section in a position adjacent to the information processing apparatus or in a manner partially superimposing the virtual object on the information processing apparatus, based on the information, wherein the information processing apparatus comprises a display configured to display an icon for performing an operation on the virtual object, and wherein the displaying the virtual object on the display section includes controlling display of the virtual object on the display section according to a signal indicative of an operation performed on the icon, which is received from the information processing apparatus.

14. The method according to claim 13, further comprising:

sending, from the head mounted display to the information processing apparatus, a request to display the icon on the display of the information processing apparatus;

notifying, by the information processing apparatus, the head mounted display that the icon is displayed on the display of the information processing apparatus in response to the request; and displaying, by the information processing apparatus, the icon on the display of the information processing apparatus.

15. A method of controlling a head mounted display comprising an image capturing unit and a display section, the method comprising:

establishing communication with an information processing apparatus; and displaying a virtual object on the display section in a position adjacent to the information processing apparatus or in a manner partially superimposing the virtual object on the information processing apparatus, based on information on the information processing apparatus, which is detected from an image captured by the image capturing unit, wherein the information processing apparatus comprises a display configured to display an icon for performing an operation on the virtual object, and wherein the displaying the virtual object on the display section includes controlling display of the virtual object on the display section according to a signal indicative of an operation performed on the icon, which is received from the information processing apparatus.

16. A non-transitory computer-readable storage medium storing a program for causing a computer to execute a method of controlling a head mounted display comprising an image capturing unit and a display section, method comprising:

establishing communication with an information processing apparatus; and displaying a virtual object on the display section in a position adjacent to the information processing apparatus or in a manner partially superimposing the virtual object on the information processing apparatus, based on information on the information processing apparatus, which is detected from an image captured by the image capturing unit, wherein the information processing apparatus comprises a display configured to display an icon for performing an operation on the virtual object, and wherein the displaying the virtual object on the display section includes controlling display of the virtual object on the display section according to a signal indicative of an operation performed on the icon, which is received from the information processing apparatus.

* * * * *